(12) United States Patent
Laredo

(10) Patent No.: US 8,207,244 B2
(45) Date of Patent: Jun. 26, 2012

(54) VISIBLE LIGHT ABSORBERS FOR OPHTHALMIC LENS MATERIALS

(75) Inventor: Walter R. Laredo, Fort Worth, TX (US)

(73) Assignee: Novartis AG, Basel (CH)

( * ) Notice: Subject to any disclaimer, the term of this patent is extended or adjusted under 35 U.S.C. 154(b) by 35 days.

(21) Appl. No.: 12/830,149

(22) Filed: Jul. 2, 2010

(65) Prior Publication Data

US 2011/0003910 A1    Jan. 6, 2011

Related U.S. Application Data

(60) Provisional application No. 61/223,275, filed on Jul. 6, 2009.

(51) Int. Cl.
| | |
|---|---|
| G02B 1/04 | (2006.01) |
| C09B 29/12 | (2006.01) |
| C09B 29/01 | (2006.01) |
| C09B 29/085 | (2006.01) |
| G02C 7/04 | (2006.01) |
| G02C 7/10 | (2006.01) |
| C08F 220/06 | (2006.01) |
| C08F 220/36 | (2006.01) |

(52) U.S. Cl. ........ 523/106; 534/839; 534/843; 534/852; 526/312; 526/328.5; 351/160 R; 351/163

(58) Field of Classification Search .................. 523/107, 523/106; 534/839, 843, 852; 351/160 R, 351/163; 526/312, 328.5
See application file for complete search history.

(56) References Cited

U.S. PATENT DOCUMENTS

| | | | |
|---|---|---|---|
| 5,374,663 A | 12/1994 | Daicho et al. |
| 5,470,932 A | 11/1995 | Jinkerson |
| 5,528,322 A | 6/1996 | Jinkerson |
| 5,543,504 A | 8/1996 | Jinkerson |
| 5,662,707 A | 9/1997 | Jinkerson |
| 5,693,095 A | 12/1997 | Freeman et al. |
| 6,528,602 B1 | 3/2003 | Freeman et al. |
| 6,806,337 B2 | 10/2004 | Schlueter et al. |
| 6,846,897 B2 | 1/2005 | Salamone et al. |
| 6,852,793 B2 | 2/2005 | Salamone et al. |
| 6,872,793 B1 | 3/2005 | Schlueter |
| 7,037,954 B2 | 5/2006 | Baba et al. |
| 7,067,602 B2 | 6/2006 | Benz et al. |
| 7,098,283 B2 | 8/2006 | Lai |
| 7,101,949 B2 | 9/2006 | Salamone et al. |
| 7,278,737 B2 | 10/2007 | Mainster et al. |
| 7,304,117 B2 | 12/2007 | Lai |
| 7,691,918 B2 | 4/2010 | Jinkerson et al. |
| 7,728,051 B2 | 6/2010 | Weinschenk, III et al. |
| 2007/0092830 A1 | 4/2007 | Lai et al. |
| 2007/0092831 A1 | 4/2007 | Lai et al. |
| 2008/0242818 A1 | 10/2008 | Benz et al. |

(Continued)

FOREIGN PATENT DOCUMENTS

CN    1727338 A    2/2006

(Continued)

OTHER PUBLICATIONS

Khamis F. Shuhaibar, The Synthesis and Characterization of UV-Absorbing Azo-Pigments and their Polymerizable Acryloyloxy and Methacryloyloxy Derivatives, Dyes and Pigments, 1992, pp. 125-136, vol. 18.

*Primary Examiner* — Michael Pepitone

(74) *Attorney, Agent, or Firm* — Patrick M. Ryan

(57) ABSTRACT

Azo compounds that block visible light are disclosed. These light absorbers are particularly suitable for use in intraocular lens materials.

18 Claims, 3 Drawing Sheets

| U.S. PATENT DOCUMENTS | | | | FOREIGN PATENT DOCUMENTS | | |
|---|---|---|---|---|---|---|
| 2009/0043105 A1 | 2/2009 | Weinschenk, III et al. | EP | 0131468 A2 | 1/1985 |
| 2009/0088544 A1 | 4/2009 | Laredo | EP | 1867683 A1 | 12/2007 |
| 2009/0093604 A1 | 4/2009 | Schlueter | JP | HEI1989299560 | 12/1989 |
| 2009/0132039 A1 | 5/2009 | Cordova et al. | JP | 02232056 | 9/1990 |
| 2009/0137745 A1 | 5/2009 | Cordova et al. | JP | 04220652 | 11/1992 |
| 2010/0113641 A1 | 5/2010 | Laredo | WO | WO2007050394 A2 | 5/2007 |

UV/Vis Spectra of Compounds A – C in $CHCl_3$ (1 mm Path)

UV/Vis Spectra of Compounds A – C in $CHCl_3$ (1 mm Path)

UV/Vis Spectra of Compounds A – C in CHCl₃ (1 mm Path)

UV/Vis Spectra of Compounds A – C in CHCl₃ (1 mm Path)

UV/Vis Spectra of UV Absorber in Combination with Compound A

Photostability of Example 11D Containing 1.51% UV-1 and 0.03% Compound A

VISIBLE LIGHT ABSORBERS FOR OPHTHALMIC LENS MATERIALS

This application claims priority from U.S. Patent Application Ser. No. 61/223,275 filed Jul. 6, 2009.

FIELD OF THE INVENTION

This invention is directed to visible light absorbers. In particular, this invention relates to novel azo compound monomers especially suitable for use in implantable ophthalmic lens materials.

BACKGROUND OF THE INVENTION

Both UV and visible light absorbers are known as ingredients for polymeric materials used to make ophthalmic lenses, and such absorbers may be used in combination with each other. These absorbers are preferably covalently bound to the polymeric network of the lens material instead of simply physically entrapped in the material to prevent them from migrating, phase separating or leaching out of the lens material. Such stability is particularly important for implantable ophthalmic lenses where the leaching of the absorber may present both toxicological issues and lead to the loss of visible light blocking activity in the implant.

Many absorbers contain conventional olefinic polymerizable groups, such as methacrylate, acrylate, methacrylamide, acrylamide or styrene groups. Copolymerization with other ingredients in the lens materials, typically with a radical initiator, incorporates the absorbers into the resulting polymer chain. Incorporation of additional functional groups on an absorber may influence one or more of the absorber's light-absorbing properties, solubility or reactivity. If the absorber does not have sufficient solubility in the remainder of the ophthalmic lens material ingredients or polymeric lens material, the absorber may coalesce into domains that could interact with light and result in decreased optical clarity of the lens.

Examples of visible light absorbers suitable for use in intraocular lenses can be found in U.S. Pat. No. 5,470,932. What is needed are additional visible light absorbing compounds that are copolymerizable with other ingredients in implantable lens materials, relatively inexpensive to synthesize, and are efficient in absorbing light between approximately 380-495 nm.

SUMMARY OF THE INVENTION

The present invention provides novel azo compounds that satisfy the above objectives. These azo compounds are especially suitable for use as monomers that absorb a portion of visible light (approximately 380-495 nm). These absorbers are suitable for use in ophthalmic lenses, including contact lenses. They are particularly useful in implantable lenses, such as intraocular lenses (IOLs).

The azo compounds of the present invention contain reactive groups, which allow for covalent attachment of the absorbers to ocular lens materials. Additionally, the absorbers of the present invention can be synthesized in approximately 3-4 steps from readily available, inexpensive starting materials without the need for column chromatography.

The present invention also relates to ophthalmic device materials containing such azo compounds

DETAILED DESCRIPTION OF THE INVENTION

Figure 1:
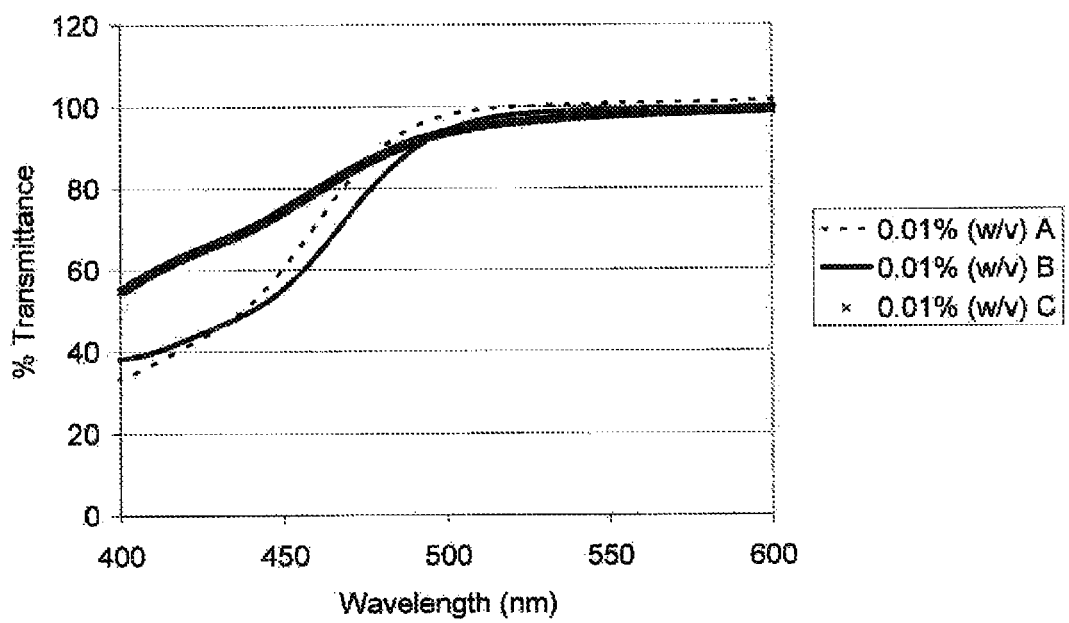
FIGS. 1-4 show percent transmittance curves for Compounds A-C at various concentrations.
Figure 2:
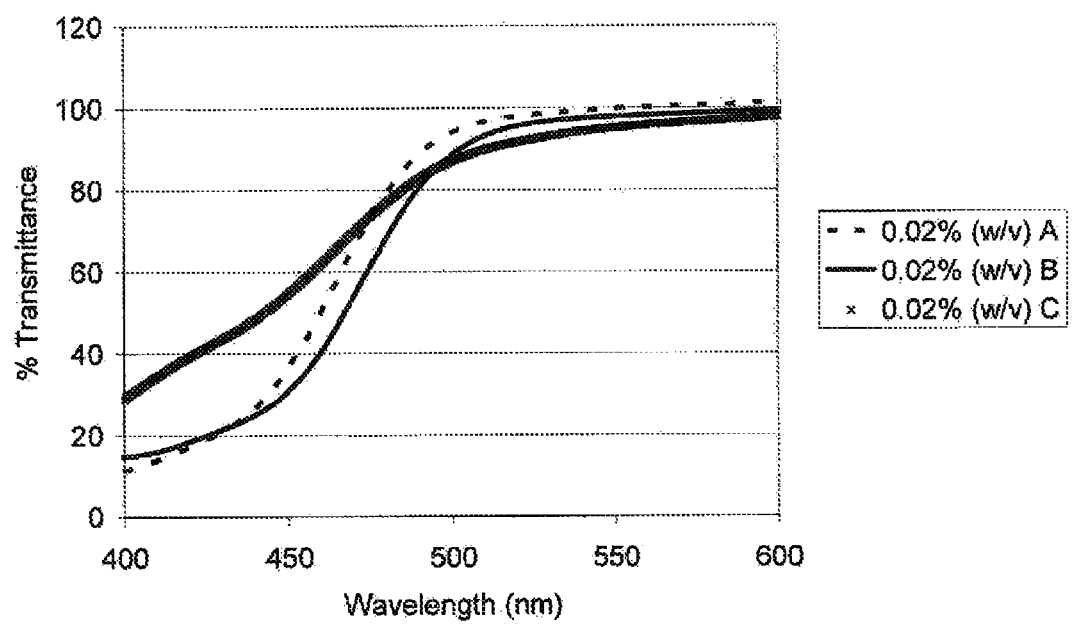
Figure 3:
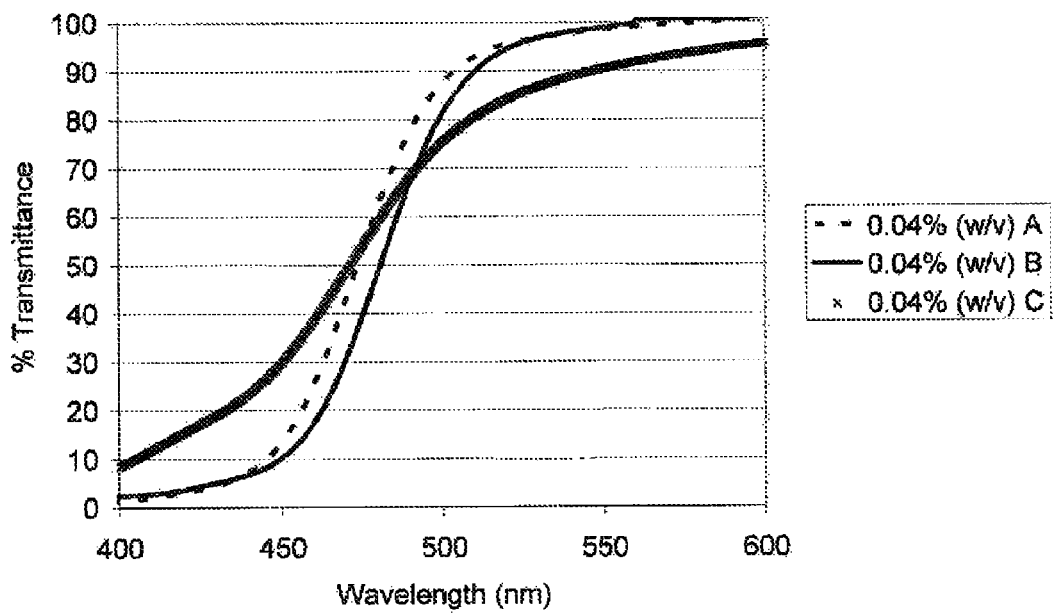
Figure 4:
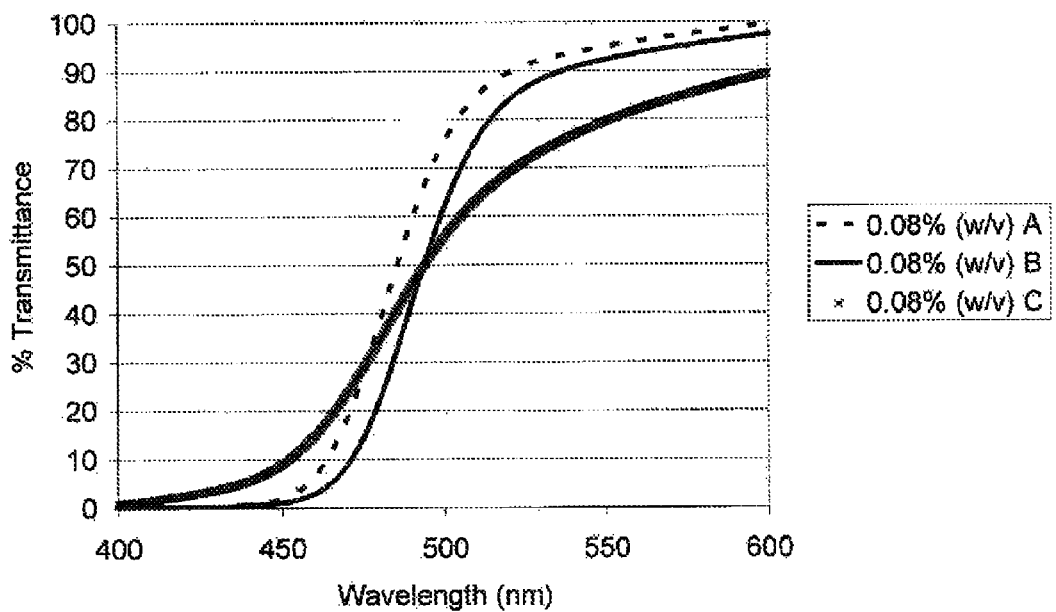

Unless indicated otherwise, all ingredient amounts expressed in percentage terms are presented as % w/w.

The azo compounds of the present invention have the following structure:

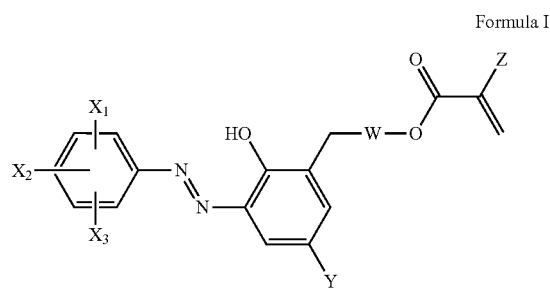

Formula I wherein $X_1$, $X_2$, and $X_3$ independently=H, $C_1$-$C_6$ alkyl, $C_1$-$C_6$ alkoxy, phenoxy, or benzyloxy;

Y=H, F, Cl, Br, I, or $C_1$-$C_6$ alkyl;

W=nothing or —O—C(=O)—NH—$CH_2$—$CH_2$—; and

Z=H, $CH_3$, $C_2H_5$, or $CH_2OH$.

Preferred compounds of Formula I are those wherein $X_1$, $X_2$, and $X_3$ independently=H, $C_1$-$C_4$ alkyl, or $C_1$-$C_4$ alkoxy, Y=H, Cl or $C_1$-$C_4$ alkyl;

W=nothing; and

Z is H or $CH_3$.

More preferred compounds of Formula I are the following three compounds: 2-hydroxy-3-((4-methoxyphenyl)diazenyl)-5-methylbenzyl methacrylate ("Compound A"); 2-hydroxy-5-methyl-3-((3,4,5-trimethoxy-phenyl)diazenyl)benzyl methacrylate ("Compound B"); and 5-chloro-2-hydroxy-3-((4-methoxyphenyl)diazenyl)benzyl methacrylate ("Compound C").

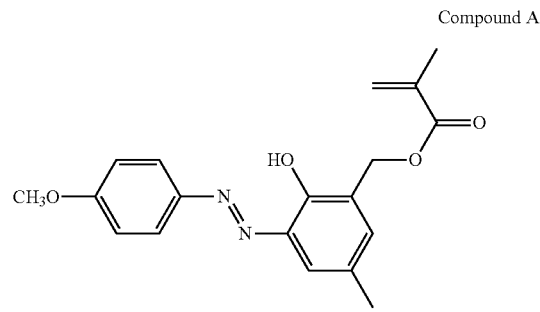

Compound A

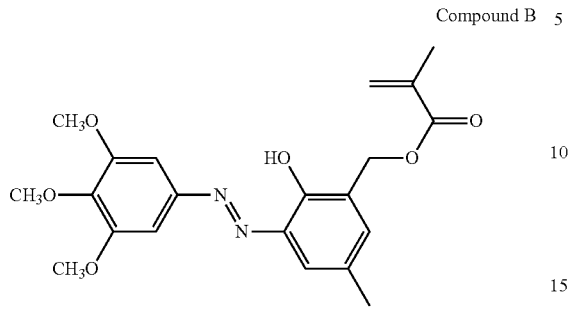

Compound B

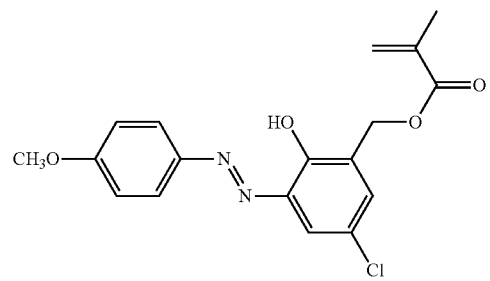

Compound C

Most preferred compounds of Formula I are Compounds A and B.

A representative synthesis of the azo compounds of Formula I is as follows.

1. In Steps 1-2, the diazonium salt of a 2-nitroaniline derivative is prepared and subsequently reacted with a desired phenol compound to form an azo dye.

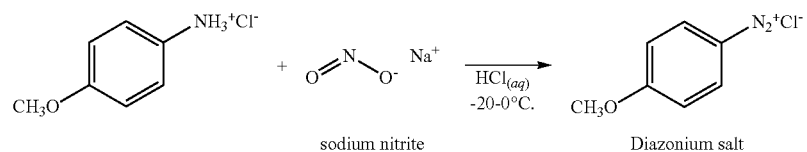

sodium nitrite          Diazonium salt

Step 1

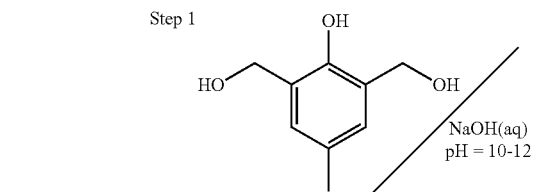

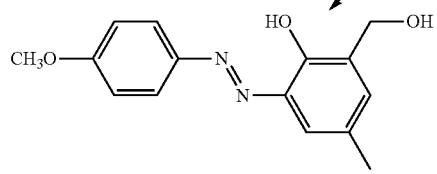

Azo dye
Step 2

2. In step 3, the free hydroxyl group of the azo dye is esterified to form a polymerizable azo dye containing a (meth)acrylate group. The (meth)acrylate group can then form covalent bonds when reacted with vinyl monomers, co-monomers, macromers, crosslinking agents, and other components typically used in making copolymeric ocular materials, particularly acrylic IOLs.

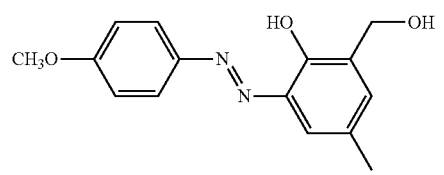

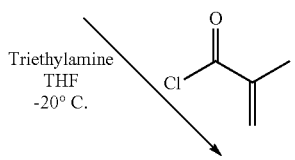

Triethylamine
THF
-20° C.

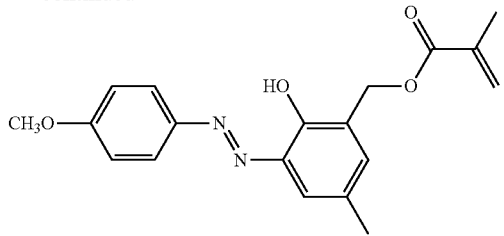

Polymerizable Azo Dye

The azo compounds of the present invention are suitable for use in ophthalmic device materials, particularly IOLs. IOL materials will generally contain from 0.005 to 0.2% (w/w) of a compound of Formula I. Preferably, IOL materials will contain from 0.01 to 0.08% (w/w) of a compound of the present invention. Most preferably, IOL materials will contain from 0.01 to 0.05% (w/w) of a compound of the present invention. Such device materials are prepared by copolymerizing the compounds of Formula I with other ingredients, such as device-forming materials, cross-linking agents. The IOL or other ophthalmic device materials containing the compounds of Formula I optionally contain UV absorbers and other visible light absorbers.

Many device-forming monomers are known in the art and include both acrylic and silicone-containing monomers among others. See, for example, U.S. Pat. Nos. 7,101,949; 7,067,602; 7,037,954; 6,872,793 6,852,793; 6,846,897; 6,806,337; 6,528,602; and 5,693,095. In the case of IOLs, any known IOL device material is suitable for use in the compositions of the present invention. Preferably, the ophthalmic device materials comprise an acrylic or methacrylic device-forming monomer. More preferably, the device-forming monomers comprise a monomer of formula II:

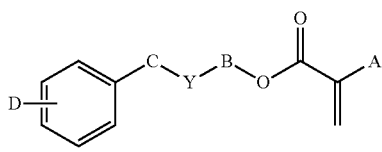

where in formula II:
A is H, $CH_3$, $CH_2CH_3$, or $CH_2OH$;
B is $(CH_2)_m$ or $[O(CH_2)_2]_z$;
C is $(CH_2)_w$;
m is 2-6;
z is 1-10;
Y is nothing, O, S, or NR', provided that if Y is O, S, or NR', then B is $(CH_2)_m$;
R' is H, $CH_3$, $C_nH_{2n'+1}$ (n'=1-10), iso-$OC_3H_7$, $C_6H_5$, or $CH_2C_6H_5$;
w is 0-6, provided that m+w≦8; and
D is H, $C_1$-$C_4$ alkyl, $C_1$-$C_4$ alkoxy, $C_6H_5$, $CH_2C_6H_5$ or halogen.

Preferred monomers of formula II are those wherein A is H or $CH_3$, B is $(CH_2)_m$, m is 2-5, Y is nothing or O, w is 0-1, and D is H. Most preferred are 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

Monomers of formula II are known and can be made by known methods. For example, the conjugate alcohol of the desired monomer can be combined in a reaction vessel with methyl methacrylate, tetrabutyl titanate (catalyst), and a polymerization inhibitor such as 4-benzyloxy phenol. The vessel can then be heated to facilitate the reaction and distill off the reaction by-products to drive the reaction to completion. Alternative synthesis schemes involve adding methacrylic acid to the conjugate alcohol and catalyzing with a carbodiimide or mixing the conjugate alcohol with methacryloyl chloride and a base such as pyridine or triethylamine.

Device materials generally comprise a total of at least about 75%, preferably at least about 80%, of device-forming monomers.

In addition to an absorber of the present invention and a device-forming monomer, the device materials of the present invention generally comprise a cross-linking agent. The cross-linking agent used in the device materials of this invention may be any terminally ethylenically unsaturated compound having more than one unsaturated group. Suitable cross-linking agents include, for example: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C$(=O)O—$(CH_2CH_2O)_p$—C(=O)C($CH_3$)=$CH_2$ where p=1-50; and $CH_2$=$C(CH_3)C$(=O)O$(CH_2)_tO$—C(=O)C($CH_3$)=$CH_2$ where t=3-20; and their corresponding acrylates. A preferred cross-linking monomer is $CH_2$=$C(CH_3)C$(=O)O—$(CH_2CH_2O)_p$—C(=O)C($CH_3$)=$CH_2$ where p is such that the number-average molecular weight is about 400, about 600, or about 1000.

Generally, the total amount of the cross-linking component is at least 0.1% by weight and, depending on the identity and concentration of the remaining components and the desired physical properties, can range to about 20% by weight. The preferred concentration range for the cross-linking component is 1-5% for small, hydrophobic compounds with molecular weights typically less than 500 Daltons, and 5-17% (w/w) for larger, hydrophilic compounds with molecular weights typically between 500-5000 Daltons.

Suitable polymerization initiators for device materials containing a compound of the present invention include thermal initiators and photoinitiators. Preferred thermal initiators include peroxy free-radical initiators, such as t-butyl (peroxy-2-ethyl)hexanoate and di-(tert-butylcyclohexyl)peroxydicarbonate (commercially available as Perkadox® 16 from Akzo Chemicals Inc., Chicago, Ill.). Initiators are typically present in an amount of about 5% (w/w) or less. Because free-radical initiators do not become chemically a part of the polymers formed, the total amount of initiator is customarily not included when determining the amounts of other ingredients.

The device materials containing an azo compound of the present invention optionally also contain a UV absorber and/or other visible light absorber. Many reactive (copolymerizable) UV absorbers suitable for use in implantable ophthalmic lenses and devices are known. Preferred UV absorbers include those disclosed in commonly assigned, co-pending U.S. Provisional Patent Application Ser. No. 61/111,204, filed Nov. 4, 2008. UV absorbers are typically present in intraocular lens materials.

In addition to the azo compound of Formula I, a device-forming monomer, a cross-linking agent, and optionally a UV absorber or other visible light absorber, the materials of the present invention may also contain other ingredients, including but not limited to agents to reduce tack or glistenings. Examples of agents to reduce tack are those disclosed in U.S. Publication Nos. 2009/0132039 A1 and 2009/0137745 A1. Examples of agents to reduce glistenings are those disclosed in U.S. Publication Nos. 2009/0093604 A1 and 2009/0088544 A1.

IOLs constructed of the materials of the present invention can be of any design capable of being rolled or folded into, a small cross section that can fit through a relatively smaller incision. For example, the IOLs can be of what is known as a one piece or multipiece design, and comprise optic and haptic components. The optic is that portion which serves as the lens. The haptics are attached to the optic and hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use in other ophthalmic devices, such as contact lenses, keratoprostheses, and corneal inlays or rings.

The invention will be further illustrated by the following examples, which are intended to be illustrative, but not limiting.

EXAMPLE 1

Synthesis of 2-(hydroxymethyl)-4-methyl-6-((3,4,5-trimethoxyphenyl)-diazenyl)phenol. In a 250 ml round bottom flask equipped with a magnetic stirrer was added 9.06 g (49.4 mmol) 3,4,5-trimethoxyaniline (Aldrich, Milwaukee, Wis.), 21 ml concentrated HCl(aq) (J. T. Baker), 100 ml absolute ethanol, and 100 ml deionized water. Sodium nitrite (3.63 g, 52.6 mmol, Sigma-Aldrich) in 30 ml water was added dropwise over 30 minutes while keeping the reaction mixture at −10° C. The reaction mixture was stirred for an additional 1 hour. Sulfamic acid (300 mg, Aldrich) was added and the mixture was stirred for an additional 20 minutes. The solids were filtered and the cold filtrate was set aside. (2-hydroxy-5-methyl-1,3-phenylene)dimethanol was dissolved in 100 ml deionized water. Approximately one-fourth by volume of a solution comprised of 10.0 g (250 mmol) NaOH in water was added to the (2-hydroxy-5-methyl-1,3-phenylene)dimethanol solution and the mixture was cooled to 0° C. The diazonium mixture and remaining NaOH solution were added simultaneously to the (2-hydroxy-5-methyl-1,3-phenylene) dimethanol mixture over 30-60 minutes and then stirred for 1 hour at 0° C. and 4 hours at ambient temperature. The mixture was poured into 3 L deionized water and acidified to pH 4 with 1 N HCl. The solid was filtered and washed with several liters water and vacuum dried at 50° C. to give a dark solid product. $^1$H NMR (CDCl$_3$) delta: 13.21 (s, 1H, Ar—OH), 7.71 (s, 1H, Ar—H), 7.21 (s, 1H, Ar—H), 7.15 (s, 2H, Ar—OH), 4.78 (s, 2H, Ar—CH$_2$), 3.96 (s, 6H, Ar—OCH$_3$), 3.94 (s, 3H, Ar—OCH$_3$), 2.39 (s, 3H, Ar—CH$_3$).

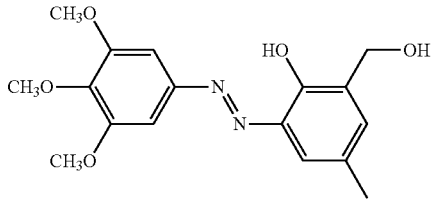

This compound (and others below) can be functionalized with pendant (meth)acrylate groups (according to Formula I) by various esterification routes. For example, the compound is dissolved in anhydrous tetrahydrofuran or dichloromethane containing MEHQ as inhibitor and pyridine as HCl acceptor. Approximately 1-1.5 molar equivalents methacryloyl chloride is added dropwise at −20-0° C. Upon addition of the methacryloyl chloride the cooling bath is removed and the reaction mixture is allowed to stir at ambient temperature for 20 hours. The HCl salts are removed by filtration and the organic layer is washed with 0.5-1N HCl, dried with MgSO$_4$ or Na$_2$SO$_4$, and then concentrated under reduced pressure to give the crude product, which is recrystallized in methanol or ethanol to give the desired product. Other standard esterification routes known to those skilled in the art include methacrylic anhydride and methyl methacrylate routes.

EXAMPLE 2

Synthesis of 2-(hydroxymethyl)-6-((4-methoxyphenyl)-diazenyl)-4-methylphenol. In a 250 ml round bottom flask equipped with a magnetic stirrer was added 8.91 g (72.4 mmol) p-anisidine (Aldrich), 30 ml conc. HCl(aq) (J. T. Baker), 150 ml absolute ethanol and 150 ml deionized water. Sodium nitrite (5.36 g, 77.6 mmol) in 30 ml water was added dropwise over 30 minutes while keeping the reaction mixture at −10° C. The reaction mixture was stirred for an additional 1 hour. 300 mg sulfamic acid was added and then stirred for an additional 20 minutes. The solids were filtered out and the cold diazonium solution was set aside. (2-hydroxy-5-methyl-1,3-phenylene)dimethanol was dissolved in 100 ml deionized water. Approximately one-fourth by volume of a solution comprised of 14.7 g (367 mmol) NaOH in water was added to the (2-hydroxy-5-methyl-1,3-phenylene)dimethanol solution and the reaction mixture was cooled to 0° C. The diazonium mixture and remaining NaOH solution were added simultaneously to the (2-hydroxy-5-methyl-1,3-phenylene) dimethanol mixture over 30-60 minutes and then stirred for an additional 1 hour at 0° C. and 4 hours at ambient temperature. The mixture was poured into 3 L deionized water and acidified to pH 4 with 1 N HCl. The solid was filtered and washed with several liters water and vacuum dried at 50° C. to give 15.9 g (81%) of an orange solid. $^1$H NMR (CDCl$_3$) delta: 13.22 (s, 1H, Ar—OH), 7.85 (m, 2H, Ar—H), 7.66 (s, 1H, Ar—H), 7.17 (s, 1H, Ar—H), 7.03 (m, 2H, Ar—H), 4.77 (s, 2H, Ar—CH$_2$), 3.89 (s, 3H, CH$_3$O—Ar), 2.37 (s, 3H, Ar—CH$_3$).

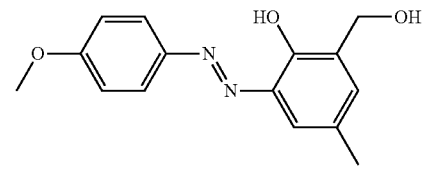

EXAMPLE 3

Synthesis of 2-hydroxy-3-((4-methoxyphenyl)diazenyl)-5-methylbenzyl methacrylate ("Compound A"). In a 500 ml round bottom flask equipped with a magnetic stirrer and gas inlet was dissolved 8.75 g (32.1 mmol) of 2-(hydroxymethyl)-6-((4-methoxyphenyl)-diazenyl)-4-methylphenol in 300 ml anhydrous THF. ~50 mg 4-methoxyphenol (MEHQ) was added followed by 16.5 g (209 mmol) anhydrous pyridine. The reaction mixture was cooled to −20° C. and 4.91 g (47.0 mmol) methacryloyl chloride was added dropwise. The reaction mixture was stirred for 1 hour at −20° C. and then 20 hours at ambient temperature. The solid was filtered and diethyl ether (200 ml) and ethyl acetate (200 ml) were added to the filtrate. The organic layer was washed with 0.5 N HCl, and then dried over magnesium sulfate. The solvent was removed under removed pressure and the crude product was recrystallized in methanol to give an orange solid which was rinsed with cold ethanol and then for 20 hours under vacuum (0.1 mm Hg) at room temperature to afford 7.0 g (64%). $^1$H NMR (CDCl$_3$) delta: 13.12 (s, 1H, Ar—OH), 7.84 (m, 2H, Ar—H), 7.68 (s, 1H, Ar—H), 7.23 (s, 1H, Ar—H), 7.02 (m, 2H, Ar—H), 6.16 (s, 1H, vinyl-H), 5.58 (s, 1H, vinyl-H), 5.31 (s, 2H, Ar—CH$_2$), 3.89 (s, 3H, CH$_3$O—Ar), 2.38 (s, 3H, Ar—CH$_3$), 1.98 (s, 3H, C=C—CH$_3$).

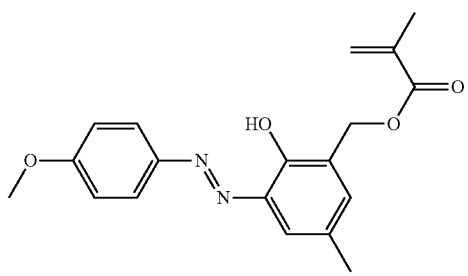

EXAMPLE 4

Synthesis of (5-chloro-2-hydroxy-1,3-phenylene)-dimethanol. In a 1 liter graduated bottle equipped with magnetic stirrer was suspended 100.4 (781 mmol) g 4-chlorophenol (99+%, Aldrich) in 500 ml water. A solution comprised of 38.9 g (973 mmol) NaOH in 100 ml water was added dropwise to the reaction mixture resulting in clearing up of the suspension. 168 g (2.07 mol) formaldehyde solution (37% in water, Aldrich) was added and the reaction mixture was covered in aluminum foil and allowed to stir for 10 days at ambient temperature and an additional 3 days without stirring. The mixture was cooled to 0° C. and filtered. The solid was suspended in ~800 ml water, and acidified with 70 ml glacial acetic acid. The mixture was cooled to 0° C., filtered, and the solid was suspended in 500 ml water, cooled to 0° C., and filtered. The off-white solid was dried under vacuum to give 43.8 g (30%).

$^1$H NMR (DMF-d$_7$) delta: 7.35 (s, 2H, Ar—H), 4.86 (s, 4H, Ar—CH$_2$).

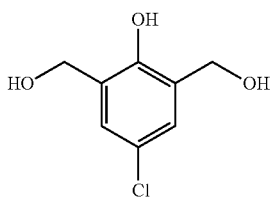

EXAMPLE 5

Synthesis of 4-chloro-2-(hydroxymethyl)-6-((4-methoxyphenyl)-diazenyl)phenol. In a 250 ml round bottom flask equipped with a magnetic stirrer was added 7.60 g (61.7 mmol) p-anisidine, 26 ml conc. HCl(aq), 150 ml absolute ethanol, and 150 ml deionized water. Sodium nitrite (4.58 g, 66.3 mmol) in 30 ml water was added dropwise over 30 minutes while keeping the reaction mixture at −10° C. The reaction mixture was stirred for an additional 1 hour. 300 mg sulfamic acid was added and the mixture was stirred for an additional 20 minutes. The solids were filtered out and the cold diazonium solution was set aside. (5-chloro-2-hydroxy-1,3-phenylene)dimethanol from Example 3 was dissolved in 100 ml deionized water. Approximately one-fourth by volume of a solution comprised of 12.7 g (318 mmol) NaOH in water was added to the (5-chloro-2-hydroxy-1,3-phenylene)dimethanol solution and the reaction mixture was cooled to 0° C. The diazonium mixture and remaining NaOH solution were added simultaneously to the (5-chloro-2-hydroxy-1,3-phenylene)dimethanol mixture over 30-60 minutes. The reaction mixture was stirred at room temperature for 16 hours. The mixture was poured into 3 L deionized water and acidified to pH 4 with 1 N HCl. The solid was filtered and washed with several liters water and vacuum dried at 50° C. to afford a dark solid.

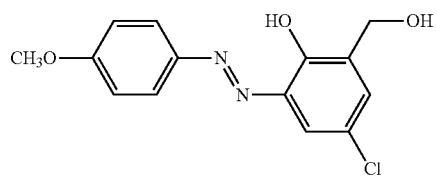

This compound may be esterified according to known methods (see Example 1 above).

EXAMPLE 6

Synthesis of (5-bromo-2-hydroxy-1,3-phenylene)dimethanol. In a 2 liter graduated bottle equipped with magnetic stirrer was suspended 101 g (585 mmol)4-bromophenol in 500 ml water. A solution comprised of 28.9 g (723 mmol) NaOH in 100 ml water was added all at once to the reaction mixture. 128 g (1.58 mol) of formaldehyde solution (Aldrich, 37% in water) was then added and the reaction mixture was covered in aluminum foil and allowed to sit for 45 days at ambient temperature. Glacial acetic acid (60 ml, 1.0 mol) was added to precipitate out the solid. The solid was washed with ample amounts of water and then dried under high vacuum (0.1 mm Hg) for 20 hours at 50° C. and ambient temperature for 48 hours to give 101.2 g (74%) of a light orange solid. $^1$H NMR (DMF-d$_7$) delta: 8.21 (s, 1H, phenol OH), 7.56 (s, 2H, Ar—H), 5.70 (s, 2H, OH), 4.90 (s, 4H, CH$_2$).

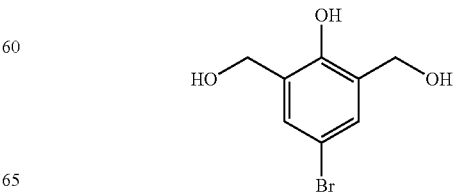

EXAMPLE 7

Synthesis of 4-bromo-2-(hydroxymethyl)-6-(p-tolyldiazenyl)phenol. In a 500 ml round bottom flask equipped with a magnetic stirrer was added 10.6 g (98.9 mmol) p-toluidine (Aldrich), 42 ml conc. HCl(aq) (J. T. Baker), deionized water (100 ml), and ethanol (100 ml) and the reaction mixture was cooled to 0° C. Sodium nitrite (7.21 g, 104 mmol)) in 50 ml water was added dropwise over 30 minutes while keeping the reaction mixture at 0° C. The reaction mixture was stirred for an additional 1 hour. 300 mg sulfamic acid was added to destroy excess nitrite and the mixture was stirred for an additional 20 minutes. (5-bromo-2-hydroxy-1,3-phenylene)-dimethanol from Example 6 was dissolved in 400 ml 50/50 ethanol/deionized water. Approximately one-fourth by volume of a solution comprised of 21.3 g (533 mmol) NaOH in 100 ml water was added to the (2-hydroxy-5-methyl-1,3-phenylene)dimethanol solution at 0° C. The diazonium mixture and remaining NaOH solution were added simultaneously to the (2-hydroxy-5-methyl-1,3-phenylene) dimethanol mixture over 60 minutes. The reaction mixture was stirred for 20 hours at ambient temperature and then poured into 3.5 L deionized water and acidified to pH 4-5 with 1 N HCl. The solid was filtered, rinsed with ample amounts of water, and dried under vacuum (0.1 mm Hg) to afford 16.64 g (52%) of a dark solid.

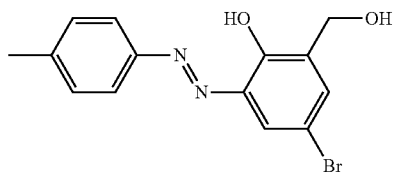

As in the case of Example 6, this compound may be esterified according to known methods (see Example 1 above).

EXAMPLE 8

Synthesis of 2-(hydroxymethyl)-4-methyl-6-(p-tolyldiazenyl)phenol. In a 500 ml round bottom flask equipped with a magnetic stirrer was charged 10.6 g (98.9 mmol) p-toluidine (99%, Aldrich), 42 ml (500 mmol) conc. HCl(aq) (J. T. Baker), deionized water 100 ml, and ethanol (100 ml) and the reaction mixture was cooled to 0° C. Sodium nitrite (7.21 g, 105 mmol) (Sigma-Aldrich) in 50 ml water was added dropwise over 20 minutes at 0° C. The reaction mixture was stirred for an additional 1 hour. 300 mg sulfamic acid (Aldrich) was added to destroy excess nitrite and the mixture was stirred for an additional 20 minutes. (2-hydroxy-5-methyl-1,3-phenylene)dimethanol (95%, Aldrich) was dissolved in 400 ml 50/50 deionized water/ethanol. Approximately one-fourth by volume of an aqueous sodium hydroxide (>97%, Aldrich) solution (21.34 g/100 ml) was added to the (2-hydroxy-5-methyl-1,3-phenylene)dimethanol solution and cooled to 0° C. The diazonium mixture and remaining NaOH solution were added simultaneously to the (2-hydroxy-5-methyl-1,3-phenylene)dimethanol mixture over 60 minutes. The reaction mixture was stirred for 20 hours at room temperature and then poured into 3.5 L deionized water and acidified to pH 4-5 with 1 N HCl. The solid was filtered and dried under high vacuum until constant weight to afford 17.8 g (70%) of an orange solid. $^1$H NMR (CDCl$_3$) delta: 13.28 (s, 1H, Ar—OH), 7.76 (d, 2H, Ar—H), 7.68 (s, 1H, Ar—H), 7.31 (d, 2H, Ar—H), 7.19 (s, 1H, Ar—H), 4.77 (s, 2H, CH$_2$), 2.44 (s, 3H, Ar—CH$_3$), 2.38 (s, 3H, Ar—CH$_3$).

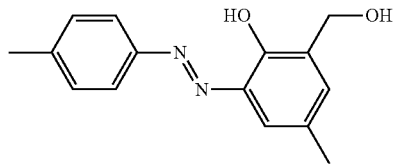

As in the case of Example 6, this compound may be esterified according to known methods (see Example 1 above).

EXAMPLE 9

Synthesis of 2-((2-hydroxy-3-((4-methoxyphenyl)diazenyl)-5-methylbenzyloxy)-carbonylamino)ethyl methacrylate. In a 500 ml 3-neck round bottom flask equipped with a magnetic stirrer and nitrogen inlet was dissolved 5.01 g (18.4 mmol) 2-(hydroxymethyl)-6-((4-methoxyphenyl)diazenyl)-4-methylphenol from Example 2 in 300 ml anhydrous THF. Stannous octoate (50 mg, Pfaltz & Bauer) was added followed by 2-isocyanatoethyl methacrylate (3.14 g, 20.2 mmol). MEHQ (100 mg) was added. The reaction mixture was stirred for 20 hr at 60° C. and then poured into 200 ml diethyl ether, and washed with 0.5 N HCl and water. The organic layer was dried with magnesium sulfate, filtered, and rotovapped to give the desired product which was recrystallized in ethanol to give 6.0 g (76%) of an orange solid. $^1$H NMR (CDCl$_3$) delta: 13.22 (s, 1H, Ar—OH), 7.85 (m, 2H, Ar—H), 7.69 (s, 1H, Ar—H), 7.23 (s, 1H, Ar—HI), 7.03 (m, 2H, Ar—H), 6.09 (s, 1H, vinyl-H), 5.57 (s, 1H, vinyl-H), 5.24 (s, 2H, Ar—CH$_2$), 5.02 (s, 1H, CONH), 4.24 (m, 2H, CH$_2$OCO), 3.90 (s, 3H, Ar—OCH$_3$), 3.53 (m, 2H, OCN-HCH$_2$), 2.38 (s, 3H, Ar—CH$_3$), 1.92 (s, 3H, CH$_3$—C=C).

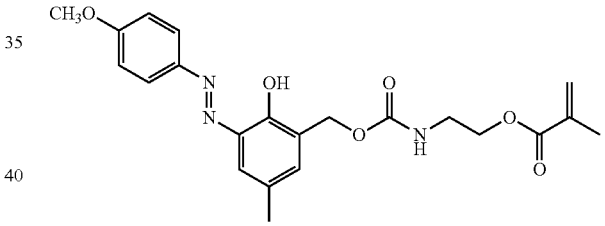

EXAMPLE 10

Figure 5:
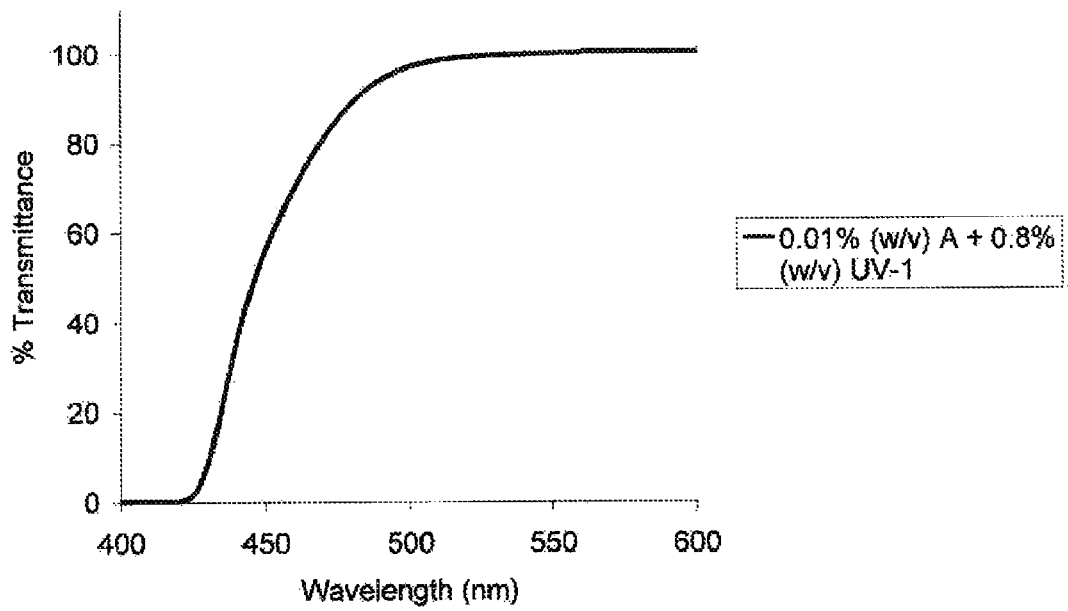
FIG. 5 shows the percent transmittance curve for a combination of Compound A and the UV absorber ("UV-1").

Transmittance curves for Compounds A-C were generated by UV/Vis spectroscopy. Each compound was dissolved in chloroform at the indicated concentration and evaluated in a PerkinElmer Lambda 35 UV/Vis spectrometer. The results are shown in FIGS. 1-4. Additionally, a transmittance curve for a combination of Compound A and the UV absorber 2-hydroxy-5-methoxy-3-(5-(trifluoromethyl)-2H-benzo[d][1,2,3]triazol-2-yl)benzyl methacrylate ("UV-1"; shown below) was generated using the same is procedure. The results for this combination are shown in FIG. 5

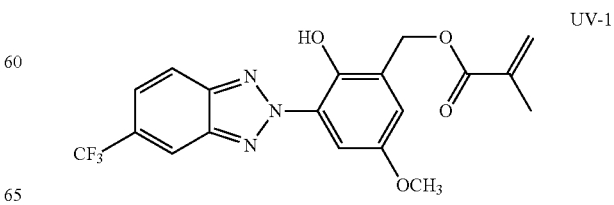

EXAMPLE 11

Acrylic IOL Formulations

Compounds of Formula I may be formulated in IOL materials as shown in Tables 1-3 below. All components are vortex mixed in a 30 ml glass vial, degassed with nitrogen, and then syringe filtered using a 0.2 micron Teflon filter into polypropylene molds. Samples are thermally cured at 70° C. for 1 hour and 110° C. for 2 hours and then extracted in acetone at 50° C. for 6 hours with fresh solvent replacement every 90 minutes.

TABLE 1

| Component | EXAMPLE (% w/w) | | | |
|---|---|---|---|---|
| | 11A | 11B | 11C | 11D |
| Compound A | 0.0208 | 0.0200 | 0.0200 | 0.024 |
| UV-1 | 1.48 | 1.49 | 1.50 | 1.52 |
| PEA | 73.1 | 73.9 | 0 | 73.6 |
| PEMA | 20.9 | 20.0 | 0 | 19.3 |
| BzA | 0 | 0 | 94.0 | 0 |
| Secondary alcohol ethoxylate, methacrylic acid ester | 3.00 | 3.03 | 3.00 | 3.00 |
| BDDA | 1.53 | 1.49 | 1.50 | 1.53 |
| PSMA | 0 | 0 | 0 | 1.00 |
| Perkadox 16S | 0 | 0.99 | 1.0 | 1.01 |
| AIBN | 0.50 | 0 | 0 | 0 |

PEA = 2-phenylethyl acrylate
PEMA = 2-phenylethyl methacrylate
BzA = benzyl acrylate
BDDA = 1,4-butanediol diacrylate
Secondary alcohol ethoxylate, methacrylic acid ester = methacrylic acid ester of Tergitol ™ NP-70 surfactant (Dow/Union Carbide)
AIBN = 2,2'-Azobis(2-methylpropionitrile)
Perkadox 16S = di-(4-tert-butylcyclohexyl) peroxydicarbonate (AkzoNobel)
PSMA = polystyrene, methacrylate terminated (Aldrich, $M_n$ ~12,000). solution (33 wt. % in cyclohexane) filtered and precipitated.

TABLE 2

| Component | EXAMPLE (% w/w) | | |
|---|---|---|---|
| | 11D | 11E | 11F |
| Compound A | 0.0300 | 0.0202 | 0.025 |
| UV-1 | 1.51 | 1.46 | 1.50 |
| PEA | 73.1 | 0 | 73.6 |
| PEMA | 20.9 | 0 | 19.3 |
| BzA | 0 | 94.1 | 0 |
| polyPEGMA | 3.00 | 3.00 | 3.01 |
| BDDA | 1.53 | 1.45 | 1.53 |
| PSMA | 0 | 0 | 1.00 |
| Perkadox 16S | 0 | 1.04 | 0.99 |
| AIBN | 0.50 | 0 | 0 |

PolyPEGMA = Macromonomer of poly(ethylene glycol) monomethyl ether methacrylate (MW = 550), Mn (SEC): 4100 Daltons, Mn (NMR): 3200 Daltons, PDI = 1.50.

TABLE 3

| Component | EXAMPLE (% w/w) | | | |
|---|---|---|---|---|
| | 11G | 11H | 11I | 11J |
| Compound A | 0.02 | 0.02 | 0.02 | 0.02 |
| UV-1 | 1.12 | 1.12 | 1.12 | 1.12 |
| PEA | 0 | 74.1 | 73.3 | 74.3 |
| PEMA | 0 | 19.9 | 20.0 | 20.0 |
| BzA | 94.3 | 0 | 0 | 0 |
| polyPEGMA | 0 | 0 | 0 | 3.00 |
| polyPEGMA2 | 3.02 | 3.25 | 3.06 | 0 |
| BDDA | 1.53 | 1.54 | 1.50 | 1.52 |
| PSMA | 0 | 0 | 1.00 | 0 |
| Perkadox 16S | 0 | 0 | 1.25 | 0 |
| AIBN | 0.50 | 0.50 | 0 | 0.50 |

PolyPEGMA2 = Macromonomer of poly(ethylene glycol) monomethyl ether methacrylate (MW = 475), Mn (SEC): 11,000 Daltons, PDI = 1.2.

EXAMPLE 12

Photostability

Figure 6:
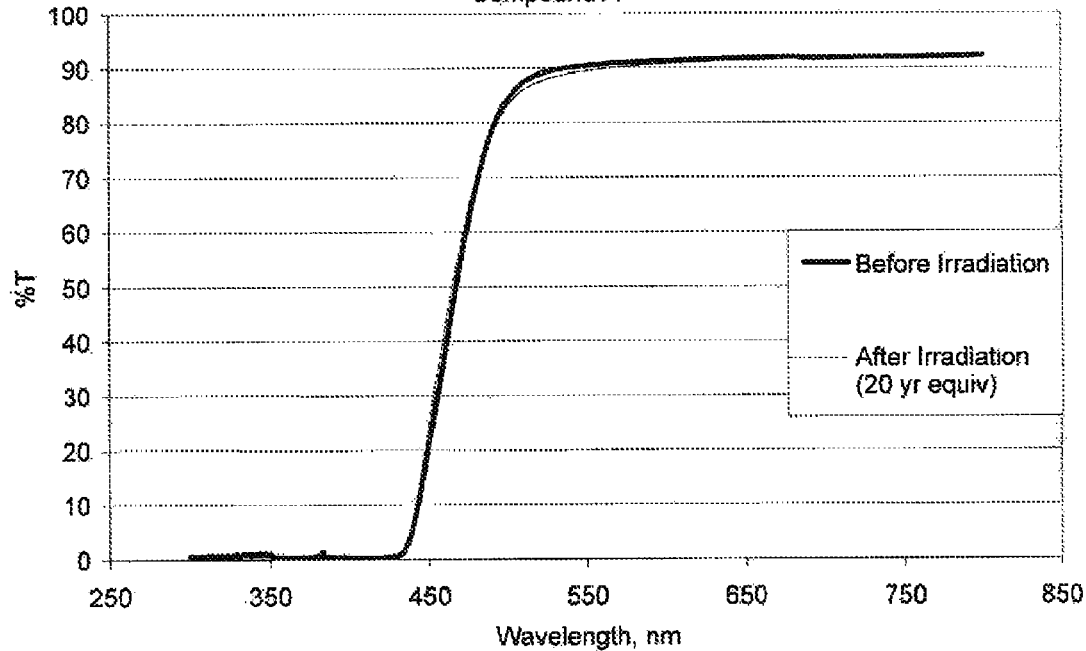
FIG. 6 shows the photostability results for the formulation of Example 11D after light exposure equivalent to 20 years

Samples of Formulation 11D were subject to UV radiation from 300 to 800 nm using an Atlas Suntest CPS+ test chamber (Atlas Electric Devices Company, Chicago, Ill.) utilizing a xenon arc lamp with light intensity of approximately 8-10 mW/cm$^2$ at the height of the test sample. The temperature of the PBS medium was 35° C. UV/Vis spectra from 0.9 mm thick sample sections were collected using a PerkinElmer Lambda 35 UV/Vis spectrometer. Results from light exposure equivalent to 20 years (Example 11D, N=3) are shown in FIG. 6.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

I claim:

1. An azo compound of the formula

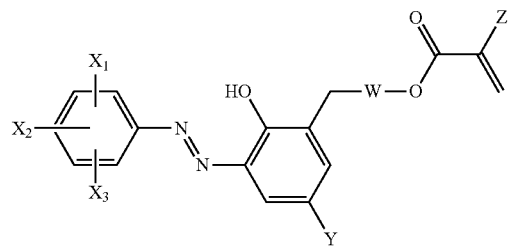

wherein
$X_1$, $X_2$, and $X_3$ independently=H, $C_1$-$C_6$ alkyl, $C_1$-$C_6$ alkoxy, phenoxy, or benzyloxy;
Y=H, F, Cl, Br, I, or $C_1$-$C_6$ alkyl;
W=nothing or —O—C(=O)—NH—CH$_2$—CH$_2$—; and
Z=H, CH$_3$, C$_2$H$_5$, or CH$_2$OH.

2. The azo compound of claim 1 wherein
$X_1$, $X_2$, and $X_3$ independently=H, $C_1$-$C_4$ alkyl, or $C_1$-$C_4$ alkoxy,
Y=H, Cl or $C_1$-$C_4$ alkyl;
W=nothing; and
Z is H or CH$_3$.

3. The azo compound of claim 2 wherein the compound is selected from the group consisting of: 2-hydroxy-3-((4-methoxyphenyl)diazenyl)-5-methylbenzyl methacrylate; 2-hydroxy-5-methyl-3-((3,4,5-trimethoxy-phenyl)diazenyl)benzyl methacrylate; and 5-chloro-2-hydroxy-3-((4-methoxyphenyl)diazenyl)benzyl methacrylate.

4. The azo compound of claim 3 wherein the compound is 2-hydroxy-3-((4-methoxyphenyl)diazenyl)-5-methylbenzyl methacrylate.

5. An ophthalmic device material comprising an azo compound of claim 1 and a device-forming monomer selected from the group consisting of acrylic monomers and silicone-containing monomers.

6. The ophthalmic device material of claim 5 wherein the ophthalmic device material comprises from 0.005 to 0.2% (w/w) of the azo compound.

7. The ophthalmic device material of claim 6 wherein the ophthalmic device material comprises from 0.01 to 0.08% (w/w) of the azo compound.

8. The ophthalmic device material of claim 7 wherein the ophthalmic device material comprises from 0.01 to 0.05% (w/w) of the azo compound.

9. The ophthalmic device material of claim 5 wherein the ophthalmic device material comprises a device-forming monomer of formula [II]:

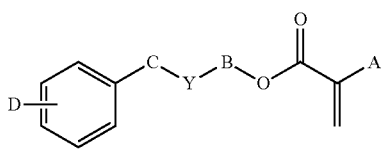

where in formula [II]:
A is H, $CH_3$, $CH_2CH_3$, or $CH_2OH$;
B is $(CH_2)_m$ or $[O(CH_2)_2]_z$;
C is $(CH_2)_w$;
m is 2-6;
z is 1-10;
Y is nothing, O, S, or NR', provided that if Y is O, S, or NR', then B is $(CH_2)_m$;
R' is H, $CH_3$, $C_{n}H_{2n'+1}$(n'=1-10), iso-$OC_3H_7$, $C_6H_5$, or $CH_2C_6H_5$;
w is 0-6, provided that m+w≦8; and
D is H, $C_1$-$C_4$ alkyl, $C_1$-$C_4$ alkoxy, $C_6H_5$, $CH_2C_6H_5$ or halogen.

10. The ophthalmic device material of claim 9 wherein in formula [II]:
A is H or $CH_3$;
B is $(CH_2)_m$;
m is 2-5;
Y is nothing or O;
w is 0-1; and
D is H.

11. The ophthalmic device material of claim 10 wherein the ophthalmic device material comprises a monomer selected from the group consisting of: 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

12. The ophthalmic device material of claim 5 wherein the ophthalmic device material comprises a cross-linking agent.

13. The ophthalmic device material of claim 5 wherein the ophthalmic device material comprises a reactive UV absorbing compound.

14. An intraocular lens comprising an azo compound of claim 1.

15. An intraocular lens comprising an azo compound of claim 2.

16. An intraocular lens comprising an azo compound of claim 3.

17. An ophthalmic device comprising the ophthalmic device material of claim 5.

18. The ophthalmic device of claim 17 wherein the ophthalmic device is selected from the group consisting of an intraocular lens; a contact lens; a keratoprosthesis; and a corneal inlay or ring.

* * * * *